US00RE34459E

United States Patent [19]

Bullen et al.

[11] E Patent Number: Re. 34,459

[45] Reissued Date of Patent: Nov. 30, 1993

[54] FRICTION MODIFIER

[75] Inventors: John V. Bullen, Bracknell; David K. Walters, Camberley, both of England

[73] Assignee: Ethyl Petroleum Additives, Limited, Bracknell, England

[21] Appl. No.: 916,908

[22] Filed: Jul. 20, 1992

Related U.S. Patent Documents

Reissue of:

[64] Patent No.: 5,021,176
Issued: Jun. 4, 1991
Appl. No.: 487,779
Filed: Mar. 5, 1990

[30] Foreign Application Priority Data

Mar. 20, 1989 [GB] United Kingdom ..... 8906345

[51] Int. Cl.[5] ..... C10M 133/16
[52] U.S. Cl. ..... 252/51.5 A; 252/77
[58] Field of Search ..... 252/51.5 A, 77

[56] References Cited

U.S. PATENT DOCUMENTS

| | | | |
|---|---|---|---|
| 3,764,536 | 10/1973 | Hellmuth et al. | 252/49.7 |
| 3,894,958 | 7/1975 | McCoy et al. | 252/51.5 A |
| 4,048,080 | 9/1977 | Lee et al. | 252/51.54 |
| 4,151,101 | 4/1979 | Anzenberger, Sr. et al. | 252/49.6 |
| 4,204,970 | 5/1980 | Lee et al. | 252/51.5 A |
| 4,303,535 | 12/1981 | Chou | 252/51.5 A |
| 4,371,446 | 2/1983 | Kinoshita et al. | 252/51.5 A |
| 4,482,464 | 11/1984 | Karol et al. | 252/51.5 A |
| 4,521,318 | 6/1985 | Karol | 252/46.7 |
| 4,839,071 | 6/1989 | Gutierrez et al. | 252/51.5 A |
| 4,839,072 | 6/1989 | Gutierrez et al. | 252/51.5 A |
| 4,839,073 | 6/1989 | Gutierrez et al. | 252/51.5 A |

FOREIGN PATENT DOCUMENTS 0020037 12/1980 European Pat. Off. .

*Primary Examiner*—Jerry D. Johnson
*Attorney, Agent, or Firm*—John F. Sieberth

[57] ABSTRACT

A friction reducing additive composition comprising a long chain succinimide derivative and a long chain amide has superior friction reducing properties, especially in wet brake systems for tractors and other vehicles.

9 Claims, No Drawings

FRICTION MODIFIER

Matter enclosed in heavy brackets [ ] appears in the original patent but forms no part of this reissue specification; matter printed in italics indicates the additions made by reissue.

This invention relates to friction modifiers for use in lubricants and lubricant additives.

Lubricants customarily in use in vehicles driven by internal combustion and other engines include additives designed to reduce engine friction and the fiction between other moving parts. One class of such friction reducing additives has been described in European Specification 0020037 in the name of Edwin Cooper Inc. The friction reducing additives of this specification comprise a compound having the structure

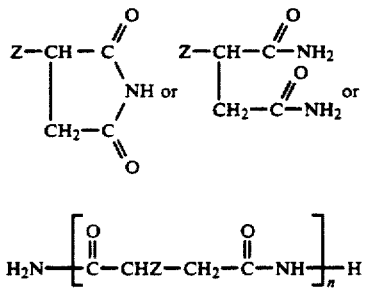

wherein n is an integer from 2 to 4 and wherein Z has the structure $R_1R_2CH$— wherein [$R_1$] $R_1$ and $R_2$ are each independently straight or branched chain hydrocarbon groups containing from 1 to 34 carbon atoms such that the total number of carbon atoms in the groups $R_1$ and $R_2$ is from 11 to 35. The radical Z may be, for example, 1-methylpentadecy, 1-propyltridecenyl, 1-pentyltridecenyl, 1-tridecylpentadecenyl, or 1-tetradecyleicosenyl.

The above highly preferred additives are made from linear α-olefins containing from 12 to 36 carbon atoms by isomerizing the α-olefins to form a mixture of internal olefins and reacting this mixture of internal olefins with maleic acid, anhydride or ester forming an intermediate and reacting the intermediate with ammonia to form amide, imide, or mixtures thereof.

Additives made from isomerized linear α-olefins have greatly improved oil solubility compared with additives made with linear α-olefins.

Such friction reducing additives are useful in a wide variety of lubricants. One class of lubricants in which the above-mentioned friction reducing additives have been used is in lubricating oils for use in wet brake systems. Agricultural tractors and similar vehicles, e.g. off-highway vehicles, have braking systems which run in the transmission oil of the back axle. The oil acts as a heat transfer medium to remove the large amounts of heat generated by braking. Such systems are however subject to the problem that the noise generated by braking may have an unacceptably high level. For any particular braking system, there is generally a level of brake pedal pressure above which the noise generated by the braking rapidly rises to an unacceptably high level (e.g. over about 100 decibels). One function of the friction reducing additives included in the oils used in such braking systems is to maximise the brake pressure which can be used before excessive noise is generated.

We have now discovered that the friction reducing properties of the aforementioned additives may be surprisingly improved by using them in admixture with an oil-soluble saturated or unsaturated acid amide of 1 to 36 preferably 4 to 24 carbon atoms. This admixture may be used to enhance the friction reducing properties of lubricants in general, especially in tractor oils. These may be used as lubricants in a wide variety of parts of a tractor e.g. as crankcase lubricant to reduce fuel consumption. However, as explained above the admixture finds particular advantage in its use in a wet brake system.

The present invention accordingly provides a friction reducing additive composition which comprises at least one compound having the structure

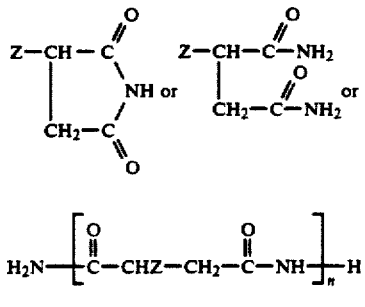

wherein n and Z are as herein before defined, and, preferably in a ratio of 1:10 to 10:1, at least one oil-soluble acid amide of the formula

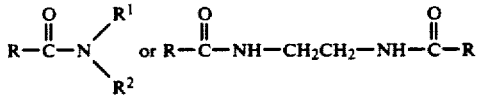

in which each R, which may be the same or different, is hydrogen or alkyl or alkenyl of 1 to 35 carbon atoms, $R^1$ and $R^2$ are each hydrogen or alkyl or alkenyl of 1 to 23 carbon atoms or one of $R^1$ and [$R_2$] $R^2$ is hydrogen and the other is a group RCO— in which R is as defined above.

Preferably the acid amide is a linear or branched alkyl or alkenyl acid amide of general formula $$R^3—CO—NH_2$$

in which $R^3$ is alkyl or alkenyl of 3 to 23 carbon atoms, or preferably 7 to 21 carbon atoms. More preferably a saturated or unsaturated fatty acid amide of 8 to 20 carbon atoms is used.

The first type of friction reducing additive is described in European Specification No. 0020037 whose disclosure is incorporated herein by reference.

The oil-soluble acid amide may be derived from any natural of synthetic acid or mixture of acids although, as indicated above, a fatty acid is preferred. For adequate oil solubility, the fatty acid should preferably contain at least 8 carbon atoms per molecule, but amides containing more than 20 carbon atoms per molecule are relatively inaccessible and therefore less preferred. Amides based on linear saturated or mono-unsaturated fatty acids containing an even number of carbon atoms are easily available and their use is preferred. Specific examples are stearamide, oleylamide, palmitamide, especially oleylamide.

The combination of friction reducing additives in accordance with the invention may be incorporated directly in a finished lubricant or, more usually, in an additive package including other constituents designed to improve the performance of the lubricant for distribution to manufacturers of the finished oil. The package usually contains also 0.5 to 20 wt. percent, preferably 1 to 5 wt. percent of a diluent oil such as a lubricating oil.

It is an important advantage of the additive combination of the present invention that improvement in friction reduction is achieved in a wet brake system without substantial impairment of the resistance of the lubricant to water. Lubricants for use in wet brake systems for tractors must satisfy a number of requirements, and reduction of noise on braking must mot be achieved at the expense of other desirable properties.

Preferred lubricants in accordance with the invention contain from 0.1% to 2.0% by weight of the long chain succinimide derivative described above and 0.05 to 1% preferably 0.1 to 1% by weight of the long chain fatty acid [amide. The] *amide, the* ratio of the succinimide derivative to the long chain amide being preferably in the range of 5:1 to 1:1 by weight.

EXAMPLE

By way of illustration of the advantageous results obtained by the present invention, a lubricant composition containing no friction reducing additives was tested in a standard system in which brake pedal pressure is increased until the noise level produced by the brakes begins to rise sharply. If is found in practice that noise level rises only slowly up to a given pedal pressure and then rises steeply. For the oil without friction reducing additives, the pressure above which the noise level began to rise rapidly was only 30 pounds per square inch. If to the same oil is added 1.35% by weight of a succinimide derivative as described above, specifically one in which Z is an alkenyl group containing an average of 22 carbon atoms, the pedal pressure above which noise begins to rise sharply is increased to 70 pounds per square inch. If oleylamide by itself is added to the base lubricant at a concentration of 0.4% by weight, the noise level begins to rise rapidly at pressures above 50 pounds per square inch. However, a combination of the same succinimide derivative at 0.75% by weight and oleylamide at 0.2% by weight gives essentially the same friction reducing effect as 1.35% by weight of the succinimide by itself. Moreover, if 0.75% by weight of the succinimide derivative is used with 0.4% by weight of oleylamide, a pedal pressure as high as 80 pounds per square inch can be applied without noise generation reaching an unacceptable level. Similarly a combination of 0.4% by weight of the succinimide derivative plus 0.3% by weight of oleylamide gives essentially the same friction reducing effect as 1.35% by weight of the succinimide by itself. Even if the concentration of the succinimide derivative is raised to 1.95% by weight (without any oleylamide) the pedal pressure can only be raised to 80 pounds per square inch before noise generation becomes excessive, whereas a combination of 1.35% by weight of the succinimide derivative and 0.6% by weight of oleylamide makes it possible to reach a pedal pressure above 100 lbs per square inch before noise levels become unacceptable. Pressures as high as this cannot be achieved by either additive alone.

These results show that while the succinimide derivative by itself can give acceptable results when used at high rates, and oleylamide by itself does not give satisfactory results, the use of a combination of the two gives surprisingly superior results to either by itself.

A lubricant composition comprising a combination of friction reducing additives also typically comprises one or more, dispersant(s), detergent(s), antioxidant(s) and extreme pressure additives(s). Such additional additives must, of course, be compatible with the friction modifiers mentioned above and with each other.

In a preferred embodiment the lubricant may also contain as ashless dispersant and an alkaline earth metal salt of a petroleum sulfonic acid or an alkarly sulfonic acid (e.g. alkylbenzene sulfonic acid).

The friction-reducing additives can be used in mineral oil or in synthetic oils of a suitable viscosity e.g. viscosity up to about $16\times10^{-3}m^2/S$ (80 SUS) at 100° C. (210° F.).

Mineral oils include those of suitable viscosity refined from crude oil from all sources including Gulfcoast, midcontienent, Pennsylvania, California, Alaska and the like. Various standard refinery operations can be used in processing the mineral oil.

Synthetic oil includes both hydrocarbon synthetic oil and synthetic esters. Useful synthetic hydrocarbon oils including liquid polymers of α-olefins having the proper viscosity. Especially useful are the hydrogenated liquid oligomers of $C_6$–$C_{12}$ α-olefins such as α-decene trimer. Likewise, alkylbenzenes of proper viscosity can be used, such as didodecylbenzene.

Useful synthetic esters include the esters of both monocarboxylic acid and polycarboxylic acid as well as monohydroxy alkanols and polyols. Typical examples are didodecyl adipate, trimethylol propane triperlargonate, pentaerythritol tetracaproate, di(2-ethylhexyl-)adipate, and dilaurly sebacate. Complex esters prepared from mixtures of mono- and dicarboxylic acid and mono- and polyhydroxyl alkanols can also be used.

Blends of mineral oil with synthetic oil are particularly useful. For example, blends of 5 to 25 weight percent hydrogenerated α-decene trimer with 75 to 95 weight percent $32\times10^{-3}m^2/S$(150 SUS 38° C.(100° F.)) mineral oil results in an excellent lubricant. Likewise, blends of about 5 to 25 weight percent di(2-ethylhexyl)adipate with mineral oil of proper viscosity results in a superior lubricating oil. Also blends of synthetic hydrocarbon oil with synthetic esters can be used. Blends of mineral oil with synthetic oil are especially useful when preparing low viscosity oil (e.g. SAE 5W 20) since they permit these low viscosities without contributing excessive volatility.

The more preferred lubricating oil compositions include zinc dihydrocarbyldithiophosphate (ZDDP) in combination with the present additives. Both zinc dialkydithiophosphates and zinc dialkaryldithiophosphates as well as mixed alkyl-aryl dithiophosphates can be used. Examples of alkyl-type ZDDP are those in which the hydrocarbyl groups are a mixture of isobutyl and isoamyl alkyl groups. Zinc di(nonylphenyl)-dithiophosphate is an example of an aryl-type ZDDP. Good results are achieved using sufficient zinc dihydrocarbyldithiophosphate to provide about 0.01 to 0.5 weight percent zinc. A preferred concentration supplies about 0.05 to 0.3 weight percent zinc.

Another additive which may be used in the oil composition is an alkaline earth metal petroleum sulfonate or alkaline earth metal alkaryl aulfonate. Examples are calcium petroleum sulfonates, magnesium petroleum sulfonates, barium alkarly sufonates, calcium alkaryl sulfonates or magnesium alkarly sulfonates. Both the neutral and the overbased sulfonates having base numbers of up to about 400 can be beneficially used. These are used in an amount to provide about 0.05 to 1.5 weight percent alkaline earth metal and more preferably about 0.1 to 1.0 weight percent.

Yet another additive which may be used in the oil compositions in an alkaline earth metal phenate or corresponding sulphurized phenate having one or more alkyl substituents containing 4 to 20 carbon atoms. Alkaline earth metal salts of phosphosulfurized polyisobutylene are also useful additives. Preferred crankcase oils also contain an ashless dispersant such as a polyolefin succinamide or succinimide of a polyethylene polyamine such as tetraethylenepentamine. The polyolefin succinic substituent is preferably a polyisobutene group having a molecular weight of from about 800 to 5,000. Such ashless dispersants are more fully described in U.S. Pat. Nos. 3,172,892 and 3,219,666.

Other useful ashles dispersants include the Mannich condensation products of polyolefine substituted phenols, formaldehyde and polyethylene polyamine. Preferably, the polyolefin phenol is a polyisobutylene-substituted phenol in which the polyisobutylene group has a molecular weight of from about 800 to 5,000. The preferred polyethylene polyamine is tetracethylene pentamine. Such Mannich ashless dispersants are more fully described in U.S. Pat. Nos. 3,368,972; 3,413,347; 3,442,808; 3,448,047; 3,539,633; 3,591,598; 3,600,372; 3,634,515; 3,697,574; 3,703,536; 3,704,308; 3,725,480; 3,726,882; 3,736,357; 3,751,365; 3,756,953; 3,793,202; 3,798,165; 3,798,247 and 3,803,039.

Other additives which may be included are antioxidants, such as alkyl phenols, sulphurised alkyl phenols and alkyl aromatic amines, particularly hindered alkyl phenols. Viscosity index improvers, pour point depressants and antifoamants are examples of other additives which may also be present.

We claim:

1. An oil-soluble friction reducing additive composition which comprises at least one succinimide derivative having the structure

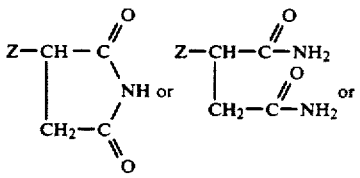

-continued

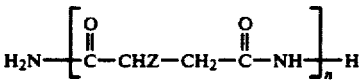

wherein n is an integer from 2 to 4 and wherein Z has the structure $R_1R_2CH$— wherein $R_1$ $R_2$ are each independently straight or branched chain hydrocarbon groups containing from 1 to 34 carbon atoms and the total number of carbon atoms in the groups $R_1$ and $R_2$ is from 11 to 35, and at least one oil-soluble acid amide of the general formula

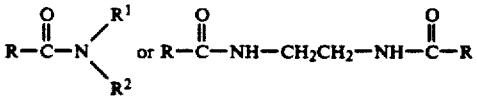

in which each R, which may be the same or different, is hydrogen or alkyl or alkenyl or 1 to 35 carbon atoms, $R^1$ and $R^2$ are each hydrogen or alkyl or alkenyl of 1 to 23 carbon atoms or one of $R^1$ and $R^2$ is hydrogen and the other is a group RCO— in which R is as defined above.

2. A composition according to claim 1 in which the weight ratio of the said succinimide derivative to the said amide is from 1:10 to 10:1.

3. A composition according to claim 2 in which the said ratio is from 5:1 to 1:1.

4. A composition according to claim 1 in which the said succinimide derivative is 1-methylpentadecyl succinimide. 1-propylridecenyl succinimide, 1-pentyltridecenyl succinimide, 1-tridecylpentadercenyl succinimide or 1-tetradecyleicosenly succinimide.

5. A composition according to clam 1 in which the said acid amide is of general formula $$R^3—CO—NH_2$$

in which $R^3$ is alkyl or alkenyl of 3 to 23 carbon atoms.

6. A composition according to claim 5 in which the said acid amide is a saturated or unsaturated fatty acid amide of 8 to 20 carbon atoms per molecule.

7. A composition according to claim 6 in which the said amide is stearamide, oleylamide or palmitamide.

8. A lubricant comprising a major amount of a lubricating oil and a friction reducing amount of the additive combination of claim 1.

9. A lubricant according to claim 8 in which the concentration by weight of the said succinimide derivative in the lubricant is from 0.1 to 2.0% by weight and the concentration of the said fatty acid amide is from 0.05 to 1% by weight.

* * * * *